April 22, 1952 G. A. GUERNSEY ET AL 2,594,155
BRAKE HOLDER CONTROL MECHANISM
Filed Feb. 23, 1950 2 SHEETS—SHEET 1
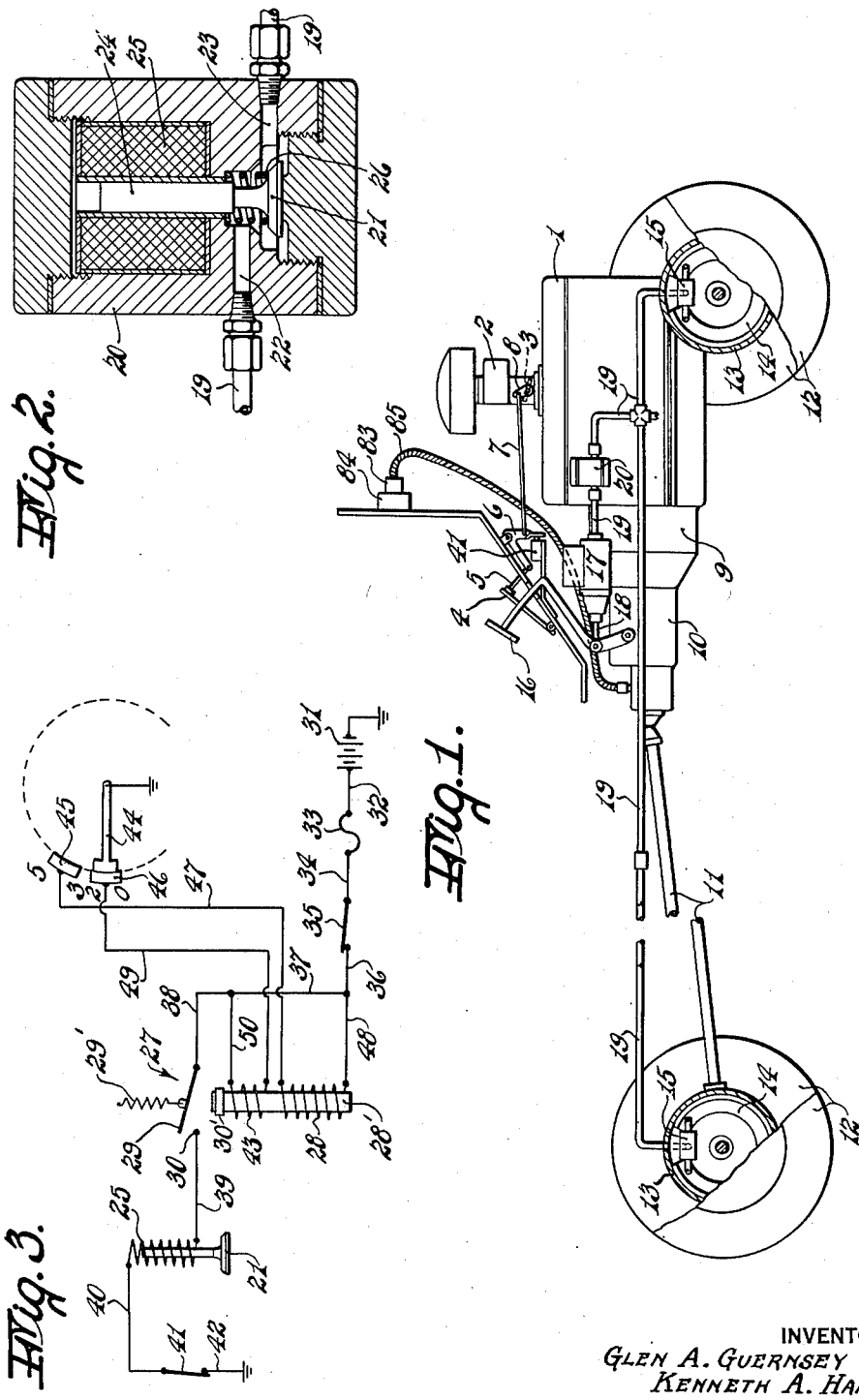
INVENTOR
GLEN A. GUERNSEY AND
KENNETH A. HARMON
BY Chapin & Neal
ATTORNEYS

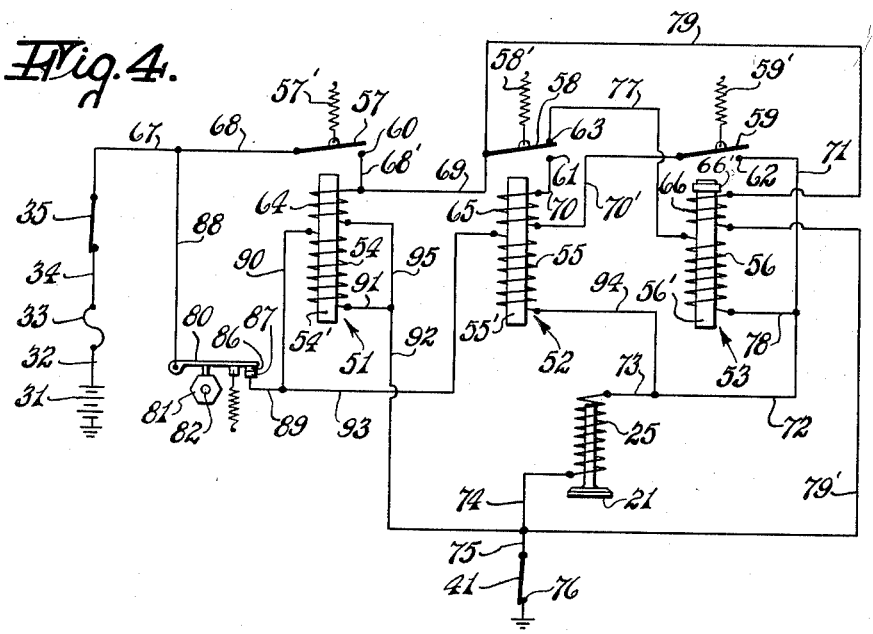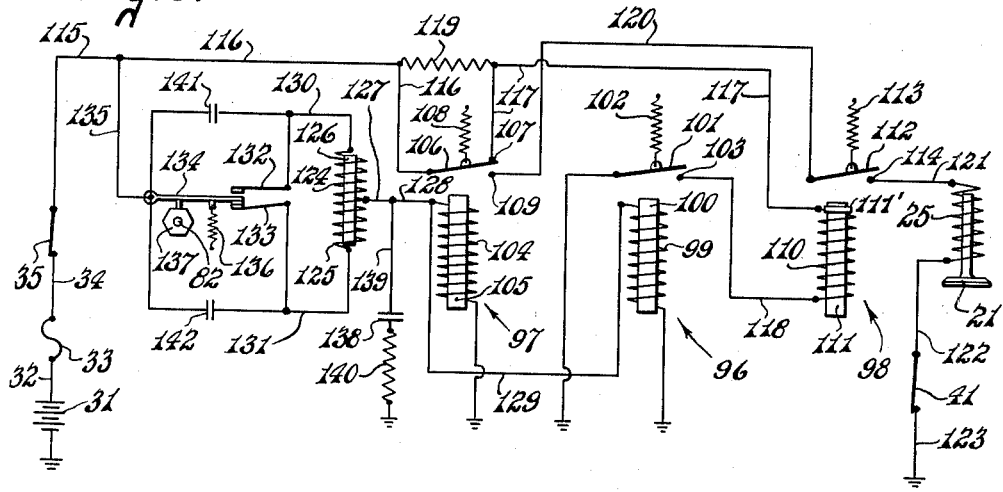

Patented Apr. 22, 1952

2,594,155

UNITED STATES PATENT OFFICE 2,594,155

BRAKE-HOLDER CONTROL MECHANISM

Glen A. Guernsey, West Springfield, and Kenneth A. Harmon, Longmeadow, Mass., assignors to Wico Electric Company, West Springfield, Mass., a corporation of Massachusetts Application February 23, 1950, Serial No. 145,692

13 Claims. (Cl. 188—152)

This invention relates generally to brake control mechanism for wheeled vehicles. The invention is particularly useful in motor vehicles, of the type in which the power of the motor is transmitted through a hydraulic clutch to the driving wheels of the vehicle, for the purpose of holding the brakes in applied condition, after they have been applied by the usual means, thereby preventing the creeping of the vehicle, which would otherwise occur, after the vehicle has been brought to a stop and the brake pedal has been released. The invention is also particularly adapted for use with a motor vehicle having hydraulic brakes.

It has been heretofore proposed to use in a hydraulic brake system, for the purpose described, a valve, which is interposed in the conduit between the master cylinder and the various brake cylinders and which is automatically closed, when the speed of the vehicle or its wheels falls below a predetermined value, in order to prevent return flow of the pressure fluid and thereby hold the brakes applied. The difficulty with this prior art arrangement is that it operates, as described, invariably, irrespective of driving conditions. Thus, with the prior art arrangement, if the vehicle should be traveling on a slippery road surface, when the brakes are applied, the wheels might be stopped with abnormal speed and the brakes become locked while the vehicle goes into a skid, with the operator powerless to quickly release his brakes as he may wish to do. The control of the brakes is taken away from the operator at the very time when he needs to use the brakes most skillfully to avoid skidding.

This invention has for its broad object the provision of a control for the brake-holder, which is sensitive to the rate of deceleration of the propeller shaft of the vehicle, as distinguished from that of the vehicle itself, and which will render the brake-holder effective only if the rate of deceleration of such shaft is within normal limits, whereby if the deceleration is faster than the normal rate, the brake-holder will not become effective and the brakes cannot be locked, so that the operator is free to manipulate the brakes as he deems necessary.

The rates, referred to, are average rates over a very short period of time. To state the matter another way, the controlling factor is the time which it takes for the propeller shaft to decrease from one relatively-low predetermined speed to another and still lower predetermined speed. If this decrease is effected too quickly, the brake-holder will not be rendered operative, while if the decrease occurs in a predetermined time or more, the brake-holder will be rendered operative.

More particularly, the invention has for an object to provide a time-delay means, which is operable in a predetermined time after its action is initiated to render the brake-holder effective, together with means, to be driven by the propeller shaft of the vehicle and to be directly responsive to its speed, for initiating the action of the time-delay means, when the speed of such shaft decreases to one predetermined and relatively-low value, and to stop the action of the time-delay means and restore the latter to initial condition, when the speed of such shaft decreases to a second and lower predetermined value, whereby if the decrease in propeller shaft speed occurs in less than said predetermined time, the action of the time-delay means is stopped and it is prevented from rendering the brake-holder operative.

The propeller shaft-speed-responsive means and the time-delay means may take various forms and several illustrative examples are shown in the accompanying drawings in which—

Fig. 1 is an elevational view of a wheeled, motor-driven vehicle embodying the invention, such parts of the vehicle as are unnecessary to an understanding of the invention being omitted;

Fig. 2 is a sectional elevational view of an electromagnetically operated, brake-holding valve, suitable for use with the invention; and Figs. 3, 4 and 5 are electrical diagrams showing three examples of control systems for the brake-holding means.

In Fig. 1, there has been indicated in diagrammatical form those parts of a motor-driven wheeled vehicle that need to be considered for an understanding of the present invention. There are shown the motor 1; the carburetor 2; throttle valve 3; an accelerator pedal 4, operable when depressed to open the throttle valve 3 through suitable connections, such as rod 5, lever 6, rod 7 and lever 8; a hydraulic clutch 9; transmission 10; propeller shaft 11; wheels 12, the rear ones of which are driven from the shaft 11 in the usual way; brake drums 13 on wheels 12; brake shoes 14 in each drum; brake cylinders 15 one within each drum for actuating the brake shoes by hydraulic pressure; a brake pedal 16; master cylinder 17, having therein the usual piston (not shown) connected as by rod 18 to pedal 16 to be actuated by the latter, when depressed, and transmit pressure through a conduit 19 to the several brake cylinders 15 and cause the brakes to be applied.

The brake-holder is indicated generally at 20 in Fig. 1. It includes a normally open valve of any suitable kind adapted to be interposed in the conduit 19 between the master cylinder 17 and the brake cylinders 15 and adapted, when closed, to prevent return flow of the pressure fluid which would otherwise occur, when brake pedal 16 is released, and thereby hold the brakes in applied condition. An illustrative example of one valve unit suitable for the purpose is shown in Fig. 2. The casing 20 has slidably mounted therein a valve 21 for controlling the communication between inlet and outlet passages 22 and 23 respectively connected on the master cylinder side and brake cylinder side in the conduit 19. The stem of valve 21 is in part a magnetic plunger 24 cooperating with a solenoid 25. A spring 26 tends to hold the valve in open position. The solenoid 25, when energized, will close valve 21 against the pressure of spring 26. Brake-holders of this type, for the purpose described, are old and well known. They may be used to control brakes on all of the wheels or those on only some of the wheels as is also old and well known in the art.

The present invention has to do with the control of the brake-holder and, particularly, with the automatic application of it—not invariably but only when driving conditions make it safe or desirable so to do. The control of the invention is operable to determine, when the brakes are applied, whether or not the propeller shaft of the vehicle is decelerating too rapidly. If it is, the brake-holder cannot be applied. If deceleration is not faster than a normal rate, the brake-holder will automatically be rendered effective, just before the wheels stop. This result can be accomplished in many ways. Examples are given herein of several general ways of effecting the result.

The first example is shown diagrammatically in Fig. 3. It involves a time-delay means and a propeller-shaft-speed-responsive means so related that the decrease in speed of shaft 11, during application of the brakes by pedal 16, from one predetermined speed to another must occur after the time-delay means has become operative. The time-delay means, as herein shown, is a time-delay relay 27 having a coil 28, which when energized for some predetermined time interval, say for example a tenth of a second, will magnetize core 28' sufficiently to move switch 29 against the force of a spring 29' into engagement with its contact 30 and close an energizing circuit to solenoid 25. The time delay relay is a standard commercial article available in the market. The delay is effected in a usual and well-known way by a closed ring 30' of copper which surrounds the pole face end of the core 28'. The aforesaid energizing circuit may be supplied from the usual six volt storage battery 31 of the motor vehicle. As shown, the energizing circuit for solenoid 25 is as follows, from the ungrounded terminal of battery 31, by wire 32, the usual fuse 33, wire 34, the usual ignition switch 35, wires 36, 37 and 38, switch 29, contact 30, wire 39, solenoid 25, wire 40, a closed switch 41 and wire 42 to ground and thus to the grounded terminal of battery 31. Thus, when the relay pulls in and closes switch 29 the solenoid 25 will be energized to close valve 21 and hold the brakes applied. The switch 41 is a release switch of any suitable kind, which can be opened at the will of the operator in order to release the brake-holder. Conveniently, this switch may be opened by depression of the accelerator pedal 4, as indicated in Fig. 1, being closed when such pedal is released and in engine-idling position and open when such pedal is depressed and in all other positions. However, the particular form of the release switch is not essential to the present invention. The time-delay relay also includes a holding coil 43, which when energized, will magnetize core 28' sufficiently to hold switch 29 closed, after it has been closed by the action of coil 28, but which is incapable of itself of effecting the closing of this switch.

The pulling-in coil 28 and the holding coil 43 of the relay 27 are controlled by speed-responsive means, which as shown consists of a movable switch member 44 and fixed contact segments 45 and 46. The movable member 44 is driven from the propeller shaft 11. It is actuated in the same way as the needle of a speedometer. The contact segment 45 covers one speed range, for example one corresponding to from 3 to 5 miles per hour of the vehicle, when the latter is driven by the wheels without slip. The segment 46 covers another speed range nearer zero, say for example from 2 miles per hour to zero. The small numerals near the ends of these segments indicate such vehicle speeds. Contact 45 is connected by a wire 47 to one terminal of relay coil 28, the other terminal of which is connected by a wire 48 to wire 38. The outer end of member 44 wipes over the contact segments at the stated, or other suitable speed ranges, and its inner end is grounded. The energizing circuit for coil 28 may be traced as follows, from the ungrounded terminal of battery 31, wire 32, fuse 33, wire 34, switch 35, wires 36 and 48, coil 28, wire 47, segment 45, member 44 to the ground and thus to the grounded terminal of the battery. Thus, the coil 28 will be connected to the battery 31 during the period while member 44 is in engagement with segment 45. The coil 28 is energized to initiate the action of the time-delay means at a propeller shaft speed corresponding to a vehicle speed of say 5 miles per hour. The action of the time-delay means will be stopped when member 44 leaves segment 45 at a speed a little less than 2 miles per hour. If the decrease from one of these predetermined speeds to the other is effected in a tenth of a second or more the relay will pull in and switch 29 will be closed to energize the solenoid 25 and apply the brake-holder. If the decrease in speed occurs in less than one tenth of a second the circuit to coil 28 will be broken and the latter will become deenergized. Thus, the action of the time-delay means is stopped and such means is restored to its initial condition before switch 29 can be closed. As the speed reaches 2 miles per hour, the member 44 engages segment 46 and energizes the holding coil 43 of the relay. This coil has one terminal connected by a wire 49 to contact 46 and its other terminal is connected by a wire 50 to wire 37. The energizing circuit for coil 43 is as follows, from the ungrounded terminal of battery 31, wire 32, fuse 33, wire 34, switch 35, wires 36, 37 and 50, coil 43, wire 49, segment 46, member 44 to the ground and thus to the grounded terminal of the battery. Thus, if switch 29 is closed, it will be held closed by coil 43 as long as member 44 engages contact 46. Release of the brake-holder will occur by opening switch 41, as for example, by depressing the accelerator pedal 4. The circuit to solenoid 25 will be broken and valve 21 will be opened by spring 26. The switch 29, however, will not open until the shaft 11 turns fast enough to move member 44 out of engagement with segment 46, in this case at a speed a little above two miles per hour. Therefore, if the accelerator pedal 4 has been depressed and the brake-holder has been released, the brake-holder can be reapplied simply by releasing the accelerator pedal and allowing switch 41 to close.

Another way of controlling the brake-holder is shown in Fig. 4. Here, three relays 51, 52 and 53 are used. These relays have pulling-in coils 54, 55 and 56 respectively mounted on cores 54', 55' and 56', which when sufficiently magnetized pull switch members 57, 58 and 59 against the force of springs 57', 58' and 59' into engagement with contacts 60, 61 and 62, respectively. Switch member 58, in addition, is adapted to engage a contact 63, when in its normal position, and to disengage therefrom when coil 55 is energized. The cores of relays 51, 52 and 53 are provided with holding coils 64, 65 and 66, respectively. Each holding coil, when energized, is not capable of itself of magnetizing its core sufficiently to pull in the switch member of its relay but it is capable of magnetizing such core sufficiently to hold such member in pulled-in position, after it has been pulled in by the action of the pulling-in coil. The relays 51 and 52 are responsive to the speed of the propeller shaft of the vehicle. Coil 54 is so designed as to cause switch member 57 to be pulled in at some predetermined and relatively-low propeller shaft speed, which may for example correspond to a vehicle speed of 5 miles per hour, and coil 55 is so designed as to cause switch member 58 to be pulled in at another predetermined and still lower propeller shaft speed, which may for example correspond to a vehicle speed of 2 miles per hour. Relay 53 is a time-delay relay, its coil 56 functioning, after energization for some short predetermined time interval, say for example one tenth of a second, to magnetize its core 56' sufficiently to pull in switch 59. The pole face end of core 56' is surrounded by a copper ring 66' to effect the desired time delay.

The energizing circuit for the brake-holding solenoid 25 includes battery 31, wire 32, fuse 33, wire 34 and ignition switch 35, as before, and then extends as follows, wires 67 and 68, switch 57, contact 60, wires 68' and 69, switch 58, contact 61, wire 70, holding coil 65, wire 70', switch 59, contact 62, wires 71, 72 and 73, solenoid 25, wires 74 and 75, release switch 41 and wire 76 to the ground and thus to the other terminal of battery 31. With the switch 58 positioned as shown a circuit to the brake-holder solenoid will be established on closure of switch 57, as follows, battery 31, wire 32, fuse 33, wire 34, closed switch 35, contact 60, wires 67 and 68, closed switch 57, wires 68' and 69, switch 58, contact 63, wire 77, coil 56, wires 78, 72 and 73, solenoid coil 25, wires 74 and 75 and closed release switch 41 to the ground and thus to the other side of battery 31. This last-named circuit, however, includes in series the relay coil 56 as well as the solenoid 25 and the combined resistances of these coils is so great that the current flowing in the circuit is insufficient to cause coil 25 to close the brake-holding valve 21. The energizing circuit for coil 56 of the time-delay relay is the same as the energizing circuit for solenoid 25 to and through switch 58 and then extends as follows, contact 63, wire 77, coil 56, wires 78, 72 and 73, solenoid 25, wires 74 and 75, release switch 41 and wire 76 to the ground and thus to the other terminal of battery 31. The action of the time-delay means is initiated when the propeller shaft speed decreases to one predetermined value, corresponding to a vehicle speed of say 5 miles per hour, when coil 54 draws switch 57 into engagement with contact 60. This closes the described energizing circuit of coil 56 of relay 53. This energizing circuit will be broken, when coil 55 of relay 52 causes switch member 58 to engage contact 61 and disengage from contact 63. This occurs when the speed of shaft 11 decreases to a second and lower predetermined value, corresponding to a vehicle speed of say 2 miles per hour. Thus, the action of the time-delay means will be stopped and such means will be restored to its initial condition. If this occurs in less than the predetermined time interval required for the time-delay relay 53 to close switch 59, the brake-holding solenoid 25 will not be energized because coil 56 will be deenergized by the pulling-in of switch 58, which in leaving contact 63 breaks the energizing circuit to coil 56. Thus, although switch 58 engages contact 61, the energizing circuit of solenoid 25 remains broken because switch 59 does not engage contact 62.

The relays must operate in the proper sequence, namely 51, 53 and 52 in order to energize solenoid 25. If operated in the sequence 51, 52 and 53, the solenoid 25 will not be energized, as has just been described. Assuming that relay 53 pulls in before relay 52 it will cause switch 59 to engage contact 62 and the holding coil 66 will then hold this switch closed. The energizing circuit for holding coil 66 may be traced as follows, from one terminal of battery 31, wire 32, fuse 33, wire 34, switch 35, wires 67 and 68, switch 57, contact 60, wires 68', 69 and 79, coil 66, wires 79' and 75, release switch 41 and wire 76 to the ground and thus to the other terminal of battery 31. The circuit to this holding coil 66 is closed when relay 51 pulls in at the first predetermined speed. Thus, as soon as the coil 56 of time-delay relay 53 closes switch 59, its holding coil 66 will be energized and available to hold this switch closed. Therefore, the breaking of the energizing circuit to coil 56 by the switch 58 leaving contact 63, when relay 52 pulls in, cannot affect switch 59 which remains closed. Thus, as in the first example, if, when the brakes are applied, the speed of the propeller shaft decreases at a normal rate, the brake-holder will be automatically applied but if the decrease from the first to the second predetermined speed occurs in less than the selected predetermined time interval, then the brake-holder will not be rendered effective.

The energization of the speed-responsive coils 54 and 55 of relays 51 and 52 is controlled by a propeller-shaft-speed-responsive switch, which is or may be, of the same general nature as the breaker of the ignition system of an automobile. Thus, a pivoted arm 80, spring pressed toward a cam 81, driven from the propeller shaft 11, as by means of the speedometer shaft 82 or one similar thereto, is oscillated at a frequency proportional to the speed of shaft 11. The shaft of a standard speedometer turns 1000 revolutions per mile. Hence, at propeller shaft speeds corresponding to vehicle speeds of five and two miles per hour, shaft 82 will turn at 83⅓ and 33⅓ revolutions per minute respectively. This switch (Fig. 1) may be located in a casing 83 in back of the speedometer 84, which is connected to the drive shaft 11 in the usual manner by a flexible shaft contained in a sheath 85. Arm 80 carries a contact 86 for cooperation with a stationary contact 87. The arm 80 is connected by a wire 88 to wire 67 and thus to the ungrounded terminal of battery 31. The contact 87 is connected by wires 89 and 90 to one terminal of coil 54. The other terminal of the latter is connected by wires 91 and 92 to wire 75 and through the latter, release switch 41 and wire 76 to the ground and the other terminal of battery 31. A wire 93 connects wire 89 to one terminal of coil 55 of relay 52 and the other terminal of this coil is connected by a wire 94 to wire 73 and thus through solenoid 25, wires 74 and 75, release switch 41, and wire 76 to the ground and thus to the other terminal of battery 31. The holding coil 64 of relay 51 has one terminal connected to wire 68' and thus to contact 60 and the other terminal connected by a wire 95 to wire 92 and thus through wire 75, release switch 41, and wire 76 to the ground and battery 31.

While the energizing circuit of coil 56 is closed by the closing of switch 57, the energizing circuits of coils 54 and 55 are closed by the speed-responsive switch only for the short time interval during which the contacts 86 and 87 are engaged. This time varies with the propeller shaft speed, decreasing as such speed increases. The inductance of coil 54 is such that, when the shaft 11 is moving at a speed corresponding to a vehicle speed of say 5 miles per hour, enough current will be passed in the interval that the speed-responsive switch is closed, to energize the coil 54 and magnetize core 54' sufficiently to close switch 57, which is then held in by coil 64 so that it will not open, when the circuit to coil 54 is subsequently broken by the speed-responsive switch. Similarly, the inductance of coil 55 and the solenoid 25, with which it is in series, is such that enough current will be passed through the coil 55 to magnetize core 55' sufficiently to pull in switch 58 only when the propeller shaft speed is at its lower predetermined value, corresponding to a vehicle speed of say 2 miles per hour. While coil 55 is connected in series with the brake-holding solenoid 25, it is to be noted that coil 55 is of such high resistance that, when its energizing circuit is closed, there will not be enough current flow through solenoid 25 to enable it to close the brake-holding valve 21.

The operation of the Fig. 4 form of the invention, will now be described. Assuming that the vehicle is in motion and the operator desires to stop it, he releases accelerator 4, thereby causing switch 41 to close and presses down on the brake pedal 16 which applies the service brakes. As the speed of the propeller shaft decreases to the first predetermined value, the relay 51 will pull in and move switch 57 into engagement with contact 60. This closes the energizing circuit for holding coil 64, which therefore maintains switch 57 closed until either the release switch 41 or the ignition switch 35 is opened. The closing of switch 57 also closes the energizing circuits for the holding coil 66 and coil 56 of the time-delay relay 53. The latter will, in the selected predetermined time, say for example one tenth of a second, close switch 59. If the propeller shaft speed does not decrease to the second and lower predetermined value until the predetermined time has elapsed, switch 59 will have closed and the subsequent pulling-in of switch 58 by relay 52 will close the energizing circuit to the solenoid 25, whereby the brake-holder will be rendered operative. If, however, the propeller shaft speed decreases more rapidly, so that relay 52 pulls in before relay 53, then the energizing circuit to coil 56 of the time-delay relay will be broken and switch 59 cannot close. Therefore, the engagement of switch 58 and contact 61 by the pulling-in of relay 52 cannot close the energizing circuit to solenoid 25 so that the brake-holder is inoperative.

Release of the brake-holder is effected by opening the release switch 41, as by depressing the accelerator pedal 4. This will open the energizing circuit to solenoid 25 and also the energizing circuits for all the relay coils 54, 55, 56 and all the holding coils 64, 65 and 66 so that the switches 57, 58 and 59 will open and the parts will be restored to their initial positions shown, ready for subsequent operation in the manner described.

Another example of the invention is shown in Fig. 5. Three relays 96, 97 and 98 are utilized. Relay 96 includes a coil 99, which is mounted on a magnetizable core 100, and a switch 101, which is normally held open by a spring 102 and which is movable by magnetic attraction of core 100, when the coil 99 is sufficiently energized, into engagement with a contact 103. Coil 99 will be thus energized at a propeller shaft speed corresponding to a vehicle speed of say five miles per hour in a manner later to be described. Relay 97 includes a coil 104, which is mounted on a magnetizable core 105, and a switch 106, which is normally held engaged with a contact 107 by a spring 108 and which is movable by the magnetic attraction of core 105, when coil 104 is sufficiently energized, into engagement with a contact 109. Coil 104 will be thus energized at a propeller shaft speed corresponding to a vehicle speed of say two miles per hour, as will later appear. Relay 98 is of a time-delay relay. It includes a coil 110, which is mounted on a magnetizable core 111 having a copper ring 111' surrounding its upper or pole face end, and a switch member 112, which is normally held open by a spring 113 and which is movable by magnetic attraction of core 111 into engagement with a contact 114 after its coil 110 has been energized for some predetermined short time, which may for example be one tenth of a second.

The energizing circuit for coil 110 will, as before, include the battery 31, wire 32, fuse 33, wire 34, and ignition switch 35, and it then extends by wires 115 and 116, switch 106, contact 107, wire 117, coil 110, wire 118, contact 103 and switch 101 to the ground and thus to the other and grounded terminal of battery 31. This energizing circuit will be closed when relay 96 causes switch 101 to engage contact 103, which occurs at the first-named propeller shaft speed. This circuit for coil 110 will be changed when relay 97 operates at the second-named predetermined speed of the propeller shaft to move switch 106 out of engagement with contact 107 and into engagement with contact 109. The circuit for coil 110 is not physically broken but a resistor 119, which is connected across between wires 116 and 117 and is normally shunted out by switch 106 when engaged with contact 107, will be introduced into the circuit to cut down the current flow to the magnet coil 110. This change reduces the current flow through magnet coil 110 to an extent such that it is unable to pull in switch 112 although it is able, if the switch has been previously closed, to hold the switch closed. The coil 110 is thus converted from a pulling-in coil to a holding coil. The circuit to the pulling-in coil is disabled as effectively by the introduction of resistor 119 into its circuit as if a physical break in the circuit occurred. The arrangement is the equivalent of the relay 53 of Fig. 4, where separate pulling-in and holding coils are used and the holding coil remains energized after the pulling in coil is deenergized.

The movement of switch 112 into engagement with contact 114, followed by the movement of switch 106 into engagement with contact 109 closes an energizing circuit to the brake-holding solenoid 25. This energizing circuit is the same as that for magnet coil 110 to switch 106 and then extends by contact 109, wire 120, switch 112, contact 114, wire 121 to solenoid 25 and thence by wire 122, closed release switch 41, and a wire 123 to the ground and thus to the other terminal of battery 31. If, however, the relay 97 causes its switch 106 to engage contact 109 before relay 98 has had time to close switch 112, then the brake-holder cannot be rendered operative because the reduced current flow through coil 110 is not sufficient to close switch 112.

The propeller-shaft-speed-responsive means for controlling the relays 96 and 97 includes a choke coil, having two equal sections 124 and 125, mounted on a common magnetizable core 126. The junction of these sections is connected by wires 127 and 128 to one terminal of coil 104 and the latter terminal is connected by a wire 129 to one terminal of coil 99. The other terminal of coil 104 and the other terminal of coil 99 is grounded. The other terminals of choke coil sections 124 and 125 are respectively connected by wires 130 and 131 to spring contact fingers 132 and 133. These fingers are alternately engaged by one end of a pivoted switch arm 134, the other end of which is connected by a wire 135 to wire 115 and thus to the ungrounded side of battery 31. The switch 134 is drawn by a spring 136 into engagement with a cam 137, which is driven by the propeller shaft 11 as for example by means of the described speedometer shaft 82. As shown, this cam has six lobes and thus the arm 134 will be oscillated six times during each revolution of shaft 82. This switch arm is arranged to move into engagement with and then, by continued movement, flex each spring contact finger. It is also arranged to engage one spring contact finger before it disengages from the other. Thus, the finger 133, which as illustrated has been previously flexed downwardly, will move upwardly, as switch arm 134 swings upwardly, until the latter engages finger 132. On continued upward movement, arm 134 will disengage from finger 133 and then flex finger 132 upwardly. The arrangement is such that one finger or the other is always connected to the arm 134. Thus, one section 124 or the other section 125 of the choke coil is always connected to the battery (when ignition switch 35 is closed) through a circuit which includes the relay coils 99 and 104 arranged in parallel. One such circuit is as follows, from the ungrounded terminal of battery 31, wire 32, fuse 33, wire 34, closed switch 35, wires 115 and 135, switch arm 134, finger 132, wire 130, choke coil section 124, wires 127, 128 and 129 and coils 104 and 99 to the ground. The other circuit is the same through switch arm 134 and then extends through finger 133, wire 131, choke coil section 125 (in a direction opposite to the previous flow through section 124) and thence by wires 127, 128 and 129 and the two coils 104 and 99 to the ground.

When the circuit is closed to one section of the choke coil, a current flow is established but, due to the inductance of the coil, there is a lag in building up the current and time is required for the current to reach its maximum value. As the speed of the cam increases, the time interval during which a circuit to either section of the choke coil is closed, decreases and the maximum values to which the current can be built up decrease. A current flow is built up through one section of the choke coil in one direction and then through the other section in the other direction and an alternating current wave is produced. This wave is smoothed out to some extent by the use of a condenser 138, one side of which is connected by wires 139 and 127 to the mid-point of the choke coil, and the other side of which is connected through a resistor 140 to the ground. The choke coil and the circuit breaker 132, 133 and 134 form a current-limiting means and they limit the current flow through both relay coils 99 and 104 proportionately to the speed of the propeller shaft of the vehicle, the current decreasing as the shaft speed increases. In this particular example, the coils 99 and 104 have substantially the same resistance and the same number of turns and the current flow through each is the same. While the magnetic pull of both relays is the same, the speed at which the two relays pull in to close their respective switches is made different by adjustment of the tension of springs 102 and 108 acting on the switch-carrying armatures of the relays and/or the air gaps between such armatures and their respective cores. The relay 96 will pull in when the propeller shaft 11 reaches the higher of the two predetermined speeds but the relay 97 will not pull in until a greater current flow has been produced to overcome the greater resistance to movement of its armature and this occurs only when the propeller shaft decreases to the lower of the two predetermined speeds.

It is desirable, in order to avoid arcing between the contacts on arm 134 and those on spring fingers 132 and 133, to bridge across each cooperating pair of such contacts a condenser, such as shown at 141 and 142.

In the diagram of Fig. 5, the coils 99, 104 and 110 have resistances of 12.68, 12.19 and 12.17 ohms, respectively; the choke coil sections 124 and 125 each have a resistance of 2.49 ohms; the resistors 119 and 140 are of 17.8 and 3 ohms resistance, respectively; the condenser 138 is of 1000 mfd. capacity; and the condensers 141 and 142 are of .1 mfd. capacity. These values are not critical but they will serve as illustrative examples of values found suitable for the purpose described. The relays are of standard form and can be procured from any relay manufacturer who will design them to function under the conditions stated.

In the operation of the Fig. 5 form of the invention, assuming that the ignition switch 35 and release switch 41 are closed and that the operator has depressed the brake pedal to apply the brakes, as the propeller shaft of the vehicle slows down to the first predetermined speed, relay 96 will pull in and close switch 106. This will close the energizing circuit to coil 110 and initiate the action of the time-delay relay 98. If the propeller shaft decelerates at a sufficiently low rate, the coil 110, which has high inductance, will have time to build up sufficient flux in its core 111 to pull in and close switch 112. This may, for example, take one-tenth of a second. The closing of switch 112 prepares the energizing circuit for solenoid 25 so that it will be closed, when the low speed relay 97 pulls in and moves switch 106 from contact 107 to contact 109. The solenoid 25 will be energized to close valve 21 and the resistor 119 will be placed in circuit with coil 110, reducing the current flow therethrough to that necessary to hold switch 112 closed and thereby disabling the energizing circuit for coil 110 for its switch-closing function. If the propeller shaft decelerates faster than the predetermined rate, then the relay 97 will pull in before the time-delay relay 98 has had time to build up enough flux in core 111 to cause switch 112 to close. This causes the resistor 119 to be placed in series with coil 110 to limit the maximum current that can be built up in the coil to a value too low to be able to pull in the switch 112. Accordingly, the energizing circuit of the solenoid 25 remains open and the brake-holder will not be rendered operative.

The Fig. 5 form of the invention has the advantage that an accidental opening of the release switch 41 will not compel complete recycling of the control in order to render the brake-holder operative again. For example, if the operator accidentally depresses the accelerator pedal and opens switch 41, whereby the brake-holder is released, the latter can be re-applied by releasing the accelerator pedal before the vehicle acquires any substantial speed. The circuit to coil 110 will not be broken until the propeller shaft of the vehicle turns at a speed, corresponding to a vehicle speed of substantially more than five miles an hour. The release speeds of the relays 99 and 104 are, of course, greater than the pulling-in speeds. The dropping out of relay 104 will cause an increase in current through coil 110 and relay 98 remains energized to hold switch 112 closed. It is the dropping out of relay 96 which breaks the energizing circuit to coil 110 and releases the brake-holder. Thus, if the release switch 41, having been opened, is closed before the propeller shaft speed exceeds the release speed of relay 96, the energizing circuit to solenoid 25 can be re-established to apply the brake-holder.

The speeds, referred to herein, are illustrative examples. They may be varied through substantial limits, as desired by changing the characteristics of the relays, choke coil and breaker switch. Also the release speed of the relays may be reduced by reducing the current flow therethrough when the relay is pulled in in much the same way as the current flow was reduced through coil 110.

In all forms of the invention, the control, in effect, senses whether the propeller shaft of the vehicle is decelerating within or faster than normal rate limits and causes the brake-holder to be rendered operative or inoperative, respectively. When the brakes are applied and the propeller shaft speed decreases to one predetermined value, a time-delay means is set in action. Such means will cause the brake-holder to be rendered effective in a predetermined time. If on continued deceleration of the shaft, the second and lower predetermined speed is reached in less than said time, the brake-holder cannot be rendered operative. This feature prevents the brake-holder from locking the brakes in applied condition, when the wheels of the vehicle are on slippery surfaces and stop suddenly when the brakes are applied. The operator is left free to release his brakes if he deems it necessary. If it takes the same or more than said predetermined time for the propeller shaft to decrease from the high to the low predetermined speed, the brake-holder will be operative. Thus, the control decides whether or not it is safe for the brake-holder to be used and renders the same operative or inoperative accordingly.

What is claimed is:

1. Brake control mechanism for wheeled vehicles, comprising, a brake-holder for maintaining the brakes in applied condition after they have been applied, means for automatically actuating the brake-holder including a timing means operable in a predetermined time after its action is initiated to render the brake-holder operative, and first and second speed-responsive controls including an actuating member adapted for connection to and to be actuated by the propeller shaft of the vehicle for respectively starting the timing means at one relatively-low predetermined speed and for disabling it at another and lower predetermined speed, whereby if the decrease from the first to the second speed occurs in less than said predetermined time the brake-holder is inoperative.

2. Brake control mechanism for wheeled vehicles, comprising, a brake-holder for holding the brakes in applied condition after they have been applied, a time-responsive control operable in a predetermined time after its action is initiated to render said brake-holder operative, a first speed-responsive control including an actuating member adapted for connection to and to be actuated by and be directly responsive to the speed of the propeller shaft of the vehicle for initiating the action of the time-responsive control when the speed of such shaft decreases to a first predetermined value, a second speed-responsive control actuated by said actuating member and adapted to disable said time-responsive control when the speed of said shaft decreases to a second predetermined value, whereby if the speed change from said first to said second value occurs in more or less than said predetermined time the brake-holder will respectively be rendered operative or inoperative, and a release for releasing the brake-holder at the will of the operator.

3. Brake control mechanism for wheeled vehicles comprising, a brake-holder for holding the brakes in applied condition after they have been applied, and controlling means for the brake-holder comprising first, second and third controls which, when successively rendered operative in a predetermined sequence, render the brake-holder effective, actuating means for the first and second controls adapted for connection to and to be driven by the propeller shaft of the vehicle and directly responsive to the speed thereof, said first control adapted to be rendered operative when the speed of such shaft decreases to one relatively-low predetermined value, said second control adapted to be rendered operative when the speed of such shaft decreases to a second and lower predetermined value; and a third control responsive to time and initiated by the first control, when the latter is rendered operative, and rendered operative a predetermined short time interval after its initiation, said controlling means being operable to render the brake-holder effective when the first, third and second controls are successively rendered operative in the order stated and inoperative when the first, second and third controls are successively rendered operative in the last-named sequence; and means for releasing the brake-holder operable at the will of the operator of the vehicle.

4. Brake control mechanism for wheeled vehicles, comprising, a brake-holder, electrical means for actuating the brake-holder, an energizing circuit for said means, a normally open switch in said circuit, a magnet coil operable when energized for a predetermined time to close said switch, an energizing circuit for said magnet coil, and speed-responsive switch means including an actuating member adapted for connection to and to be actuated by the propeller shaft of the vehicle and located in said last-named circuit for maintaining the same closed and effective through and only through a predetermined range of relatively low shaft speeds.

5. Brake control mechanism for wheeled vehicles, comprising, a brake-holder, electrical means for actuating the brake-holder, an energizing circuit for said means, a normally open switch in said circuit, a magnet coil operable when energized for a predetermined time to close said switch, an energizing circuit for said magnet coil, and speed-responsive switch means including an actuating member adapted for connection to and to be actuated by the propeller shaft of the vehicle and located in said last-named circuit for closing the latter at one predetermined and relatively-low speed and for disabling it at another predetermined and still lower speed, whereby if the change from the first to the second-named predetermined speed occurs in less than said predetermined time the first energizing circuit will be disabled before the first switch can be closed by said electrical means and the brake-holder will not be rendered operative.

6. Brake control mechanism for wheeled vehicles, comprising, electromagnetic means for holding the brakes in applied condition after they have been applied, an energizing circuit for said electromagnetic means including a time switch operable to close in a predetermined time after its action is initiated; electrical means for controlling the action of the time switch and including an electrical circuit, first and second speed-responsive switches and an actuating member therefor adapted for connection to and to be actuated by the propeller shaft of the vehicle, said first speed-responsive switch operable to close such circuit at a first predetermined low speed, said second speed-responsive switch operable to disable such circuit at another and lower predetermined speed; whereby said electromagnetic means will be energized only if the decrease from the first to the second named speed occurs in said predetermined time or in a longer time.

7. Brake control mechanism for wheeled vehicles, comprising, electromagnetic means for holding the brakes in applied condition after they have been applied, and controlling means for said electromagnetic means, comprising, an energizing circuit for said electromagnetic means including a time switch operable to close in a predetermined time after its action in initiated, and normally-open first and second speed-responsive switches, actuating means for said last-named switches adapted for connection to and to be actuated by the propeller shaft of the vehicle and operable to respectively close the first and second speed-responsive switches when the speed of such shaft respectively decreases to a first predetermined low value and a second and lower value, electrical means for initiating the action of said time switch and comprising an energizing circuit including said first speed-responsive switch, and a third and normally closed speed-responsive switch by said actuating means and opening when the speed decreases to the second-named value.

8. Brake control mechanism for wheeled vehicles, comprising, a brake-holder for holding the brakes in applied condition after they have been applied, a time responsive control for actuating said brake-holder in a predetermined time after its action is initiated; electrical means for controlling the time responsive control including an electrical circuit, a normally open first switch and a normally closed second switch in such circuit; first and second electromagnets for respectively closing and opening the first and second switches, energizing circuits for said electromagnets, and a circuit breaker in the last-named circuits including an actuating member adapted for connection to and to be driven by the propeller shaft of the vehicle and in direct response to the speed thereof for opening and closing the last-named circuits at a rate proportional to the speed of said shaft, said first electromagnet having characteristics such as to be energized sufficiently to close the first switch at and below a first and relatively low speed of said shaft, the second electromagnet having characteristics such as to open the second switch at or below a second and lower predetermined speed of said shaft.

9. Brake control mechanism for wheeled vehicles, comprising, electromagnetic means for holding the brakes in applied condition after they have been applied; an energizing circuit for said means; a time-delay relay having a switch located in said circuit, a first coil operable, when energized for a predetermined time, to close said switch, and a second coil operable, when energized, to hold said switch closed after it has been closed by the first coil but incapable of itself of closing said switch; an energizing circuit for said first coil and speed-responsive control means therefor, including an actuating member adapted for connection to and to be actuated by the propeller shaft of the vehicle and operable to close said second circuit, when the speed of such shaft decreases to a first and relatively-low predetermined value and to open said second circuit when the speed of such shaft decreases to a second and lower predetermined value; whereby if the change from the first to the second predetermined speed is effected in more or less than said predetermined time said switch respectively will or will not be closed by the first coil of said relay, an energizing circuit for said holding coil, control means for the last-named circuit operable to close the same not later than when said switch closes, and a release switch in the first energizing circuit normally closed when the brakes are applied and adapted to be opened by the operator of the vehicle to deenergize said electromagnetic means and release the brakes.

10. Brake control mechanism for wheeled vehicles, comprising electromagnetic means for holding the brakes in applied condition after they have been applied, an energizing circuit for said means including a switch; a time-delay relay for actuating said switch and including a first coil operable, when energized for a predetermined time to close said switch and a second coil operable, when energized, to hold said switch closed after it has been closed by the first coil but incapable of itself of closing said switch; an energizing circuit for said first coil, first and second speed-responsive switches, and an actuating member for the two last-named switches adapted for connection to and to be actuated by the propeller shaft of the vehicle and operable to actuate the first speed-responsive switch to close said second circuit at a first relatively-low predetermined speed of said shaft, and operable to actuate the second speed-responsive switch to open said second circuit at a second and lower predetermined speed of said shaft, whereby if the change from the first to the second predetermined speed is effected in more or less than said predetermined time said first switch respectively will or will not be closed by the first coil of said relay, an energizing circuit for said holding coil, and a release switch in the first energizing circuit normally closed when the brakes are applied and adapted to be opened by the operator of the vehicle to deenergize said electromagnetic means and release the brakes.

11. Brake control mechanism for wheeled vehicles, comprising electromagnetic means for holding the brakes in applied condition after they have been applied, an energizing circuit for said means including a switch; a time-delay relay for actuating said switch and including a first coil operable, when energized for a predetermined time, to close said switch, and a second coil operable, when energized, to hold said switch closed after it has been closed by the first coil but incapable of itself of closing said switch; an energizing circuit for said first coil, speed-responsive control means for said second circuit including an actuating member adapted for connection to and to be actuated by the propeller shaft of the vehicle directly responsive to the speed thereof, said control means being operable to close said second circuit when the speed of such shaft decreases to a first and relatively-low predetermined value and to open said second circuit when the speed of such shaft decreases to a second and lower predetermined value, whereby if the change from the first to the second predetermined speed is effected in more or less than said predetermined time the second switch respectively will or will not be closed by the first coil of said relay, an energizing circuit for said holding coil, control means for closing said last-named circuit not later than when said first switch closes, and a release switch in the first energizing circuit normally closed when the brakes are applied and adapted to be opened by the operator of the vehicle to deenergize said electromagnetic means and release the brakes.

12. Brake control mechanism for wheeled vehicles, comprising electromagnetic means for holding the brakes in applied condition after they have been applied, an energizing circuit for said means; a time-delay relay including a switch located in said circuit, a first coil operable when energized for a predetermined time to close said switch, and a second coil operable when energized to hold said switch closed after it has been closed by the first coil but incapable of itself of closing said switch; an energizing circuit for said first coil, second and third switches included in series in said second circuit, first and second electromagnets adapted when energized to respectively close the second switch and open the third switch, third and fourth energizing circuits for the electromagnets of the second and third switches, a circuit breaker in the third and fourth circuits and including an actuating member adapted for connection to and to be actuated by the propeller shaft of the vehicle, whereby the third and fourth circuits are closed and opened at a rate proportional to the speed of said shaft, said first electromagnet being energized sufficiently to close the second switch at one predetermined and relatively low shaft speed and said second electromagnet being energized sufficiently to open the third switch at another and lower predetermined shaft speed, an energizing circuit for said holding coil, control means for closing the last-named circuit not later than when said first switch closes, and a release switch in the first energizing circuit normally closed when the brakes are applied and adapted to be opened by the operator of the vehicle to deenergize said electromagnetic means and release the brakes.

13. Brake control means for wheeled vehicles, comprising, a brake-holder, electric means for actuating the brake-holder, an energizing circuit for said means adapted for connection to a source of electricity, a switch in said circuit, a second electrical means for actuating said switch, a second energizing circuit for said second means adapted for connection to said source, and means for varying the voltage applied from said source to the second energizing circuit inversely with the speed of the propeller shaft of the vehicle, said last-named means comprising two choke coils connected together at one end and to one point in said second circuit, switch means including two contacts which are connected one to each of the other ends of the choke coils, a movable member which is connected to said second circuit at another point, and actuating means adapted for driving connection with the propeller shaft of the vehicle for moving said member to engage alternately with said contacts and engage with one before it disengages from the other.

GLEN A. GUERNSEY.
KENNETH A. HARMON.

REFERENCES CITED

The following references are of record in the file of this patent:

UNITED STATES PATENTS

| Number | Name | Date |
|---|---|---|
| 2,028,491 | Barrett et al. | Jan. 21, 1936 |
| 2,156,782 | Freeman | May 2, 1939 |
| 2,272,320 | Freeman | Feb. 10, 1942 |
| 2,313,430 | Goepfrich | Mar. 9, 1943 |
| 2,329,156 | Coffey | Sept. 7, 1943 |
| 2,334,611 | Darling | Nov. 16, 1943 |